United States Patent
Camera

(10) Patent No.: US 12,043,021 B2
(45) Date of Patent: Jul. 23, 2024

(54) ROOM TEMPERATURE FOAMED AND CURED CARRIERS

(71) Applicant: ZEPHYROS, INC., Romeo, MI (US)

(72) Inventor: Michael Camera, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 17/641,026

(22) PCT Filed: Sep. 21, 2020

(86) PCT No.: PCT/US2020/051778
§ 371 (c)(1),
(2) Date: Mar. 7, 2022

(87) PCT Pub. No.: WO2021/061565
PCT Pub. Date: Apr. 1, 2021

(65) Prior Publication Data
US 2022/0324197 A1  Oct. 13, 2022

Related U.S. Application Data

(60) Provisional application No. 63/029,853, filed on May 26, 2020, provisional application No. 63/009,105, (Continued)

(51) Int. Cl.
*B32B 5/18* (2006.01)
*B29C 44/18* (2006.01)
(Continued)

(52) U.S. Cl.
CPC ............... *B32B 5/18* (2013.01); *B29C 44/18* (2013.01); *B32B 7/12* (2013.01); *B32B 27/065* (2013.01);
(Continued)

(58) Field of Classification Search
CPC ............... B29C 44/18; B29K 2075/00; B29K 2105/0097; B29K 2105/04;
(Continued)

(56) References Cited

U.S. PATENT DOCUMENTS

| | | |
|---|---|---|
| 4,619,860 A | 10/1986 | Brown et al. |
| 7,077,460 B2 | 7/2006 | Czaplicki et al. |

(Continued)

FOREIGN PATENT DOCUMENTS

| | | |
|---|---|---|
| CN | 101909870 A | 12/2010 |
| WO | 2016149700 A1 | 9/2016 |
| WO | 2020205355 A1 | 10/2020 |

OTHER PUBLICATIONS

Maia et al., "Study of Antioxidant Activity of a Phenyl Phosphorylated Compound Derived from Hydrogenated Cardol by Thermogravimetric Analysis", British Journal of Applied Science & Technology, 3(3): 546-555, 2013. (Year: 2013).*

(Continued)

*Primary Examiner* — Hai Vo
(74) *Attorney, Agent, or Firm* — The Dobrusin Law Firm, P.C.; Daniela M. Thompson-Walters

(57) ABSTRACT

A structural carrier comprising: a foam core and an outer layer, the foam core and the outer layer being free of structurally reinforcing ribs and open pockets, wherein the structural carrier is curable at a temperature of about 0° C. to about 50° C. The structural carrier may also foam at room temperature. The structural carrier may have an adhesive material disposed on at least a portion of the outer layer.

13 Claims, 8 Drawing Sheets

Related U.S. Application Data filed on Apr. 13, 2020, provisional application No. 62/907,045, filed on Sep. 27, 2019.

(51) Int. Cl.
| | |
|---|---|
| *B29K 75/00* | (2006.01) |
| *B29K 105/00* | (2006.01) |
| *B29K 105/04* | (2006.01) |
| *B32B 7/12* | (2006.01) |
| *B32B 27/06* | (2006.01) |
| *B32B 27/40* | (2006.01) |

(52) U.S. Cl.
CPC .......... *B32B 27/40* (2013.01); *B29K 2075/00* (2013.01); *B29K 2105/0097* (2013.01); *B29K 2105/04* (2013.01); *B32B 2266/0278* (2013.01); *B32B 2305/72* (2013.01); *B32B 2307/54* (2013.01); *B32B 2405/00* (2013.01)

(58) Field of Classification Search
CPC .... B32B 2266/0271; B32B 2266/0278; B32B 2305/72; B32B 2307/50; B32B 2307/54; B32B 2405/00; B32B 2605/00; B32B 27/065; B32B 27/40; B32B 5/18; B32B 7/12

See application file for complete search history.

(56) References Cited

U.S. PATENT DOCUMENTS

| | | | |
|---|---|---|---|
| 7,097,794 B2 | 9/2006 | McLeod et al. | |
| 7,105,112 B2 | 9/2006 | Czaplicki et al. | |
| 7,111,899 B2 | 9/2006 | Gray | |
| 7,374,219 B2 | 5/2008 | Brennecke | |
| 7,445,400 B2 | 11/2008 | Takeuchi | |
| 7,579,068 B2 | 8/2009 | Allen et al. | |
| 7,790,280 B2 | 9/2010 | Busseuil | |
| 7,838,100 B2 | 11/2010 | McLeod et al. | |
| 8,127,506 B2 | 3/2012 | Schneider | |
| 9,067,382 B2 | 6/2015 | Shepherd et al. | |
| 9,187,592 B2 | 11/2015 | Finter et al. | |
| 2002/0192387 A1 | 12/2002 | Agarwal et al. | |
| 2003/0099826 A1* | 5/2003 | Juras | B62D 29/04 428/354 |
| 2003/0184121 A1* | 10/2003 | Czaplicki | B29C 70/745 156/244.14 |
| 2004/0124553 A1 | 7/2004 | Czaplicki et al. | |
| 2009/0305876 A1* | 12/2009 | Singh | C09K 5/045 252/364 |
| 2014/0113983 A1* | 4/2014 | Czaplicki | C09J 181/04 521/95 |
| 2018/0037695 A1* | 2/2018 | Czaplicki | C08G 59/4071 |
| 2018/0111349 A1 | 4/2018 | Polidore et al. | |
| 2018/0155519 A1 | 6/2018 | Shepherd et al. | |

OTHER PUBLICATIONS

International Search Report and Written Opinion mailed Dec. 7, 2020, PCT Application No. PCT/US2020/051778.

Potentially related U.S. Appl. No. 62/828,691, filed Apr. 3, 2019 (published as WO2020/205355).

First Office Action and Search Report, mailed Oct. 30, 2023, Application No. 202080067004.5.

* cited by examiner

ROOM TEMPERATURE FOAMED AND CURED CARRIERS

FIELD

The present teachings generally relate to a structural carrier, and more specifically, a room-temperature foamed and cured structural carrier.

BACKGROUND

In the transportation and construction industries, epoxy-based adhesives and foams may be frequently used to provide structural support, sealing, sound attenuation, or a combination thereof. For curing and expansion of such adhesives and foams, the addition of separate curing agents and blowing agents may often be required, adding expense and time for manufacturing. Additionally, fire retardance of the adhesives and foams may also be frequently desired, requiring even more additional agents for imparting the same. Moreover, the adhesives and foams often require an increased temperature for curing, activation, or both.

Furthermore, epoxy-based adhesives and foams may frequently require one or more strengthening features to provide adequate structural integrity in the transportation and construction industries. For example, the epoxy-based adhesives and foams may often be supported or disposed on one or more layers of a carrier to improve structural integrity, stiffness, mounting capabilities, or a combination thereof. These carrier and adhesive/foam combinations may require specific tooling and complicated designs to ensure proper manufacturing. As a result, the reinforcement members may require extensive time, development, and cost to create proper performance.

Examples of structural members can be found in U.S. Pat. Nos. 7,111,899; 7,374,219; 7,790,280; and 8,127,506, all of which are incorporated herein for all purposes. There remains a need for an alternative adhesive and foam material for manufacturing structural carriers. What is needed is a structural carrier material that is curable and/or foamable at room temperature. There remains a need for a structural carrier having a simplified structure. What is needed is a structural carrier free of secondary or additional strengthening features such as ribs, pockets, or both. There remains a need for a simplified material for manufacturing structural carriers. What is needed is a structural carrier free of secondary blowing agents, secondary curing agents, glass-fiber reinforcement, or a combination thereof.

SUMMARY

The present teachings meet one or more of the present needs by providing a structural carrier comprising: a foam core and an outer layer, the foam core and the outer layer being free of structurally reinforcing ribs and open pockets, wherein the structural carrier is curable at a temperature of about 0° C. to about 50°.

The present teachings meet one or more of the present needs by providing a structural carrier, wherein: the foam core and the outer layer are monolithically formed; the structural carrier is a solid foam material; an adhesive is disposed on at least a portion of the outer layer; the structural carrier has a modulus of elasticity of about 20 MPa to 8,000 MPa; the adhesive is coextensive with the structural carrier; the structural carrier is formed from one or more phosphate esters; the structural carrier foams at room temperature; wherein the structural carrier is free of any blowing agents, curing agents, or both; the outer layer is an adhesive and the core is a solid foam material; the structural carrier is cured at room temperature and the adhesive is a heat-activated adhesive curable above 50° C.; the structural carrier is flame retardant; the structural carrier is formed from one or more epoxy resins and one or more phosphate esters, wherein the structural carrier foams and cures at room temperature; the structural carrier is formed from a material comprising one or more phosphate esters and polyurethane; the one or more phosphate esters includes a phosphate ester derived from cashew nutshell liquid (CNSL); the structural carrier is free of any glass-fiber reinforcing materials; the structural carrier is free of any mechanical fasteners; the structural carrier is a structural reinforcement in a transportation vehicle; or a combination thereof.

The present teachings meet one or more of the present needs by providing a method of forming a structural carrier, the method comprising: (a) molding the outer layer; and (b) spraying a foam into the outer layer to form the foam core, wherein the outer layer may be a blow-molded adhesive material that cures at a temperature greater than about 50° C.

The present teachings meet one or more of the present needs by providing a method of forming a structural carrier, the method comprising: (a) forming the foam core into a desired shape using one or more sprayable foaming materials; and (b) casting, overmolding, pressing, or a combination thereof an adhesive material to the foam core along at least a portion of the foam core.

The present teachings meet one or more of the present needs by providing: a structural carrier having a simplified structure; a structural carrier free of secondary or additional strengthening features such as ribs, pockets, or both; a simplified material for manufacturing structural carriers; a structural carrier free of secondary blowing agents, secondary curing agents, glass-fiber reinforcement, or a combination thereof; or a combination thereof.

DETAILED DESCRIPTION

Figure 1:
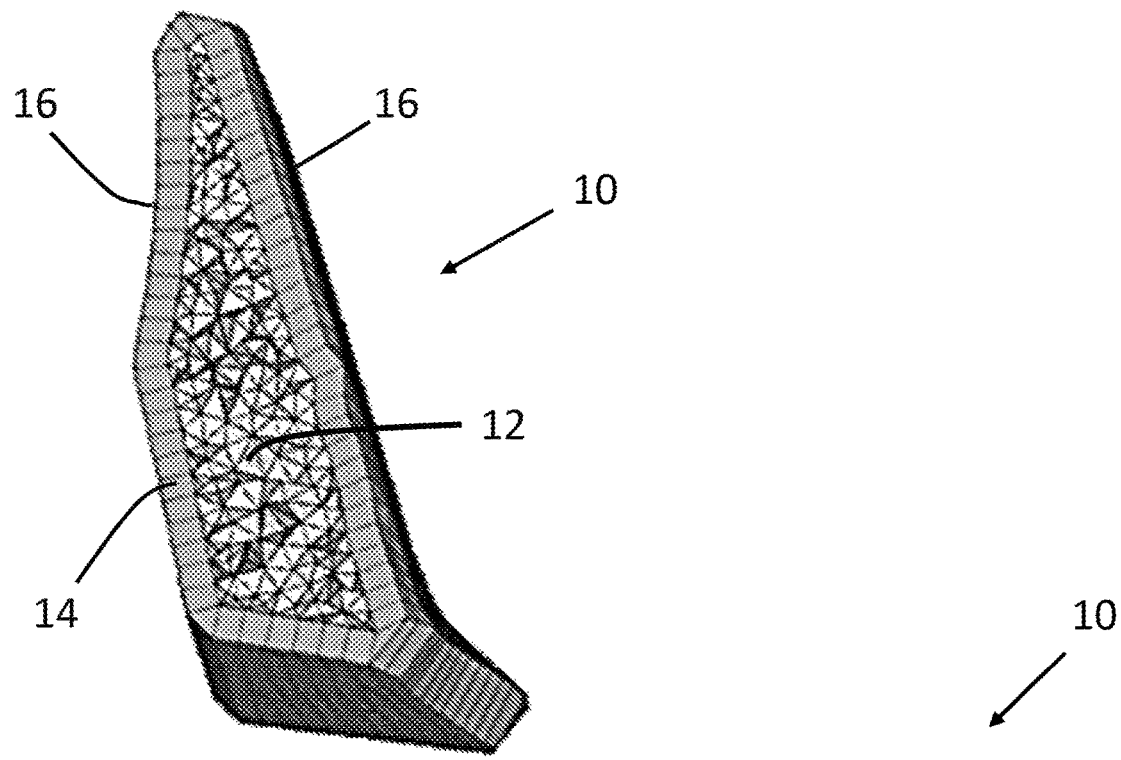
FIG. 1 is a cross-sectional view of a carrier in accordance with the present teachings.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a carrier. The carrier may function to provide structural integrity to a vehicle, structure, or both. The carrier may function to support one or more vehicle structures, vehicle components, or both. The carrier may function to baffle sound within a structure, dampen vibration within a structure, or both. The carrier may be configured for integration into any vehicle, such as an automobile, truck, airplane, boat, train, or a combination thereof. The carrier may be configured for any industry requiring structural reinforcement, noise dampening, vibration dampening, or a combination thereof. The carrier may be used in any industry, including automotive, aeronautical, aerospace, residential and/or commercial real estate construction, transportation, or a combination thereof. For example, the carrier may be positioned in an automobile to support and/or stiffen one or more structures and/or components of the vehicle, such as an A-pillar, B-pillar, C-pillar, steering column, transmission, engine block, instrument panel, console, or a combination thereof. Alternatively, or additionally, the carrier may reinforce a body of an automobile. It is contemplated that the present teachings may also provide a carrier with a high level of energy absorption during impact and/or operation. For example, the carrier may absorb about 30% or more, about 50% or more, or about 70% or more energy when impacted. The carrier may absorb about 95% or less, about 85% or less, or about 80% or less energy when impacted. Therefore, it may be gleaned from the present teachings that the carrier may beneficially improve a vehicle's structure, thereby improving safety, longevity, operation, or a combination thereof of the overall vehicle.

The carrier may provide increased structural integrity to one or more components, one or more structures, or both. The carrier may increase structural integrity during impact of the one or more components, one or more structures, or both. The carrier may increase energy absorption from a direct impact, an indirect impact, or both. The carrier may have an increased stiffness, hardness, or both. The carrier may have increased elasticity. The increased elasticity may increase torsion of the carrier so that the carrier flexes more before failure (e.g., shearing). The carrier may have a modulus of elasticity of about 20 MPa or more, about 1,000 MPa or more, or about 4,500 MPa or more. The carrier may have a modulus of elasticity of about 8,000 MPa or less, about 6,000 MPa or less, or about 5,000 MPa or less. The carrier may flex about 0.5% or more, about 1% or more, or about 2% or more relative to an initial position of the carrier prior to a force being applied to the carrier. The carrier may flex about 5% or less, about 4% or less, or about 3% or less relative to an initial position of the carrier prior to a force being applied to the carrier.

It is contemplated that the carrier may be formed into any desired shape with any desired dimensions to meet the needs of a given application. Accordingly, the carrier may include one or more undulations, one or more steps, one or more notches, one or more contoured portions, one or more arcuate portions, one or more edges, one or more linear portions, one or more planar portions, or a combination thereof. The carrier may include one or more strengthening features, such as ribs, gussets, strengthening beads, or a combination thereof. However, it is contemplated that, given the structure of the carrier, the carrier may be free of any strengthening features. As such, it is contemplated that the carrier may be a monolithically formed structure and the carrier may include a substantially uniform shape free of secondary attachments and/or features.

The carrier may include one or more mounting features. The carrier may include one or more attachment features to secure the carrier to a structure being reinforced. The attachment features may be a mechanical attachment, an adhesive attachment, or both. For example, the carrier may be free of mechanical attachments and may only include an adhesive attachment feature. The adhesive attachment feature may be monolithically (i.e., integrally) formed with the carrier or may be disposed on one or more surfaces of the carrier. The carrier may be formed of substantially a single material or may be formed of a plurality of materials. For example, the carrier may be made from a plurality of materials blended together to form the carrier.

The carrier may be manufactured using a variety of techniques. The carrier may be molded (e.g., injection-molded, blow-molded, or both), stamped, extruded, pultruded, cast, cut, sprayed, or a combination thereof. It is contemplated that the carrier may be manufactured using simplified techniques when compared to traditional structural reinforcements. As the carrier may be free of any secondary reinforcing structures, the carrier may be manufactured free of costly and/or time-consuming secondary operations. For example, all or a portion of the carrier may be blow-molded as opposed to injection-molded to decrease cost, decrease manufacturing time, or both. The carrier may be manufactured in a conventional manner, shipped to a job site, and installed in a desired application. However, the carrier may also provide a method of manufacturing where the carrier may be formed and installed substantially or entirely simultaneously. For example, the carrier may be formed using a foaming spray so that the foaming spray is sprayed directly on or in one or more portions of a vehicle (e.g., a pillar of the vehicle cab), the foaming spray foams and cures in place based on a contour of the vehicle structure, and an adhesive may be disposed between the cured carrier and the vehicle to finalize assembly. Alternatively, a secondary adhesive may not be required for assembly. The carrier may be a tape (e.g., a user may cut a desired length of the carrier from a continuous roll of tape), may be formed using a spray (i.e., a foaming spray of phosphate ester may be sprayed onto one or more desired structures to form a carrier for reinforcement, or both.

The carrier may be tunable to meet any desired requirements of a given application. The carrier may be tunable based on a material used to manufacture the carrier. The carrier may be a polymeric material, a polyamide material, or both. The carrier may be a reinforced polymeric material. For example, the carrier may be reinforced with a secondary material, such as glass or aramid fibers. However, it is contemplated that the carrier is free of secondary reinforcing materials, such as glass fibers or the like. The carrier may be a thermoset material. The carrier may be a thermoplastic material. The thermoplastic material may be an epoxy thermoplastic material. Alternatively, the carrier may be free of thermoset materials. For example, the carrier may not require a heightened temperature for curing. The carrier may comprise a foaming material. Similarly, the foaming may be completed without requiring a heightened temperature for curing.

The curing, foaming, or both may occur at a temperature of about 40° C. or less, about 30° C. or less, about 20° C. or less, or about 0° C. or less. The curing, foaming, or both may occur at a temperature of about 0° C. or more, about 10° C. or more, or even about 20° C. or more. The curing, foaming, or both may occur at a temperature from about 10° C. to about 35° C. The curing, foaming, or both may occur at a temperature of about 10° C. The curing, foaming, or both may occur at room temperature (e.g. at a temperature of about 15° C. to about 25° C.). The curing, foaming, or both may occur at a temperature of about 23° C. The curing and foaming may occur at different temperatures or at substantially the same temperature.

It is contemplated that the carrier may be made from a material free of secondary agents. The carrier may foam, cure, or both free of a secondary blowing agent, curing agent, or both. Accordingly, the carrier manufacturing process may be simplified by eliminating most or all secondary additives in the carrier such as blowing agents, curing agents, reinforcing additives (e.g., glass-fibers), flame retardant additives, or a combination thereof. As such, the carrier may be manufactured using a material that may inherently include the aforementioned material properties. Examples of materials that may form the carrier of the present teachings may be found in Provisional U.S. Application No. 62/828,691, filed on Apr. 3, 2019; and U.S. Patent Publication No. 2018/0037695, both of which are incorporated herein for all purposes. The carrier may be formed using one or more phosphate esters, epoxy, phosphoric acid, or a combination thereof.

The carrier may include a core. The core may function to provide a structural foundation for the carrier. The core may function to increase structural integrity of the carrier. The core may function to baffle sound, vibrations, or both. The core may be formed using any of the aforementioned manufacturing methods of the carrier. For example, the core may be a solid foam core. The core may be free of voids, cavities, pockets, or a combination thereof not inherent to the manufacturing process or cross-linking of the core during formation. For example, the core may be free of any intentionally designed pockets that may increase structural integrity of a traditional carrier. The core may be any desired size and shape. The core may include one or more arcuate portions, one or more linear segments, one or more planar portions, one or more undulations, one or more bumps, one or more contours, or a combination thereof. The core may be substantially uniform. The core may cure, foam, or both at room temperature. The core may be structurally rigid or may be flexible. For example, the core may have a modulus of elasticity of about 20 MPa or more, about 1,000 MPa or more, or about 4,500 MPa or more. The core may have a modulus of elasticity of about 8,000 MPa or less, about 6,000 MPa or less, or about 5,000 MPa or less. The core may flex about 0.5% or more, about 1% or more, or about 2% or more relative to an initial position of the core prior to a force being applied to the core. The core may flex about 5% or less, about 4% or less, or about 3% or less relative to an initial position of the carrier prior to a force being applied to the core.

The core may be at least partially or entirely surrounded by an outer layer. The outer layer may function as a protective layer surrounding the core. The outer layer may function as an interface between the carrier and one or more structures being reinforced. The outer layer may be an outer surface of the core. For example, the core may be a solid foam material that cures at room temperature and forms a solid outer layer. Alternatively, the outer layer may be a secondary material and the core may be inserted into the outer layer. For example, the outer layer may be an adhesive material that is blow-molded to form a shell-like structure and the core may be formed by spraying a foaming material into the outer layer. The outer layer may provide different material properties in addition to the core. While the outer layer and the core may comprise substantially similar materials, the overall material composition of the outer layer and the core may differ enough to provide different properties. For example, while both the outer layer and the core may be made from an ester material, the outer layer may be denser, more rigid, stronger, or a combination thereof when compared to the ester material of the core, and the core may provide a higher expansion rate. As such, the present teachings advantageously provide a carrier tunable to meet the demands of a given application. By modifying the outer layer relative to the core—even if both the outer layer and the core comprise at least some overlapping materials—the carrier may be tuned to meet demands without excess material costs or weight when compared to a carrier free of an outer layer.

The outer layer may include one or more arcuate portions, one or more linear segments, one or more planar portions, one or more undulations, one or more bumps, one or more contours, or a combination thereof. The outer layer may include one or more attachment mechanisms or may be free of attachment mechanisms. The outer layer may be substantially uniform. For example, the outer layer may have a thickness substantially uniform throughout the outer layer or may vary along the outer layer. The outer layer may have a thickness of about 1 mm or more, about 5 mm or more, or about 10 mm or more. The outer layer may have a thickness of about 100 mm or less, about 50 mm or less, or about 25 mm or less. The outer layer may be free of any structural reinforcing elements, such as ribs, gussets, or both. The outer layer may be shaped substantially similar to a mating surface of a structure being reinforced.

The carrier may include one or more sides. The sides may function to establish a shape of the carrier and support one or more components of a vehicle, a structure of the vehicle, or both. The sides may define outer dimensions of the carrier. The sides may interconnect to form a shape of the carrier. For example, peripheral edges of the sides may connect to one another to form an outer perimeter of the carrier. The sides may be an exterior surface of the carrier. For example, the sides may be formed from the outer layer of the carrier, one or more exposed portions of the core, or both. The sides may vary in size and shape. The sides may have a uniform thickness. The sides may have one or more arcuate portions, one or more linear segments, or both. The sides may be integrally formed (i.e., formed as a single piece free of secondary adhesives or fasteners that connect the sides). The sides may form any desired shape of the carrier. For example, the sides may form a shape of the carrier that is substantially rectangular, square, trapezoidal, cylindrical, or a combination thereof.

An adhesive may be disposed on the core, the outer layer, or both. The adhesive may function to secure the carrier to one or more additional carriers, a structure being reinforced, or both. For example, the adhesive may secure the carrier within a structure of a pillar of an automobile. The adhesive may be disposed on one or more surfaces of the core, one or more surfaces of the outer layer, or both. The adhesive may be disposed on one or more sides of the carrier. The adhesive may be coextensive with one or more portions of the carrier. The adhesive may extend beyond a periphery of the carrier. The adhesive may substantially enclose the carrier, the core, the outer layer, or a combination thereof. The adhesive may form the outer surface. For example, the adhesive may be cast and/or overmolded around a portion or substantially all of a core of the carrier. Alternatively, the adhesive may be blow-molded to form the outer surface and a foam may be inserted into the outer surface to form the core. The adhesive may be disposed on the outer surface. The adhesive may be secured to the carrier free of any secondary fasteners, such as bolts, screws, nails, hooks, latches, other mechanical fasteners, or a combination thereof.

The adhesive may be curable. The adhesive may be cured at a heightened temperature during a manufacturing process, such as a paint baking process of a vehicle. The adhesive may be cured at a temperature similar to a curing temperature of the carrier, a temperature higher than a curing temperature of the carrier, or both. For example, the adhesive may be cured at room temperature after a baking process of a vehicle and be unaffected by a temperature of the baking process (e.g., the adhesive is unaffected by a temperature of about 205 degrees or less). The adhesive may have a desired curing time. The curing time may be about 30 seconds or more, about 1 minute or more, or about 5 minutes or more. The curing time may be about 10 minutes or less, about 8 minutes or less, or about 6 minutes or less.

The adhesive may be applied to the carrier before insertion into a structure being reinforced, after the carrier has been inserted into a structure being reinforced, or both. The adhesive may be applied to the carrier using a variety of manufacturing techniques. The adhesive may be overmolded around a portion or the entirety of the carrier. Alternatively, or additionally, the adhesive may be displaced within a mold to form around the carrier. For example, a molten adhesive may be placed within a cavity so that when a carrier is pressed onto the adhesive within the cavity, the adhesive flows around the carrier within the mold, thereby at least partially covering the carrier.

While a mold may be used to form the adhesive around the carrier, the adhesive may also be preformed and directly attached to the carrier. The adhesive may be formed into a desired shape and pre-cut using a die. Once cut, the adhesive may then be disposed on the carrier and secured to the carrier. The adhesive may be secured using a fastener, mechanical connection, or both. For example, the adhesive may be connected to the carrier using secondary fasteners, such as a clip, screw, nail, etc. Alternatively, the carrier may include posts or attachment projections integrated into the carrier that secure the adhesive to the carrier. Additionally, the adhesive may be a pressure sensitive adhesive that is applied to the carrier using a desired pressure free of secondary fasteners.

The adhesive may also be vacuum formed around the carrier. The carrier may be disposed between heated layers of adhesive. The adhesive layers may then form a void around the carrier. The void may by vacuumed to remove all air created between the adhesive and the carrier until the adhesive directly contacts the carrier, thereby creating the resulting finished carrier.

It is envisioned that the adhesive may secure the carrier within a structure. The adhesive may adhere directly to one or more surfaces within a structure, such as a cavity of a vehicle. Once the carrier is properly positioned within the cavity, the adhesive may be cured to maintain the position of the carrier relative to the cavity. It should be noted that adhesive may be tacky, in which the carrier may be directly secured to a surface prior to curing. Alternatively, or additionally, the adhesive may be dry to the touch at room temperature or any desired temperature. A non-tacky adhesive may help prevent degradation of the adhesive during transportation and/or installation caused by debris or other contaminants adhering to the adhesive generally caused by tackiness. Accordingly, a carrier with a non-tacky adhesive may be positioned within a structure using one or more fasteners or mechanical connections prior to cure of the adhesive. The one or more fasteners or mechanical connections may be temporary to only secure the carrier prior to curing the adhesive. After cure, the adhesive may act as the primary securing means of the carrier within the structure.

Turning now to the figures, FIG. 1 illustrates a cross-sectional view of a carrier 10. The carrier 10 includes a core 12 substantially surrounded by an outer layer 14. The outer layer 14 includes a plurality of adjoining sides 16 that form an outer structure of the carrier 10. It should be noted that the outer layer 14 and the core 12 may be monolithically formed (i.e., integrally formed). For example, the outer layer 14 and the core 12 may each be formed from a single material composition (e.g., a foamed material).

The carrier 10 may be utilized in a variety of manners depending on a given application. As discussed herein, the carrier 10 may be preformed using one or more manufacturing techniques to form the carrier 10. The carrier 10 may then be inserted into a structure (e.g., a cavity of a vehicle) and secured within the vehicle using an adhesive, one or more mechanical fasteners, or both. However, the carrier 10 may also be formed directly within the structure being reinforced. Instead of preforming a desired shape of the carrier 10, the carrier 10 may be injected directly into a structure. Advantageously, injecting and forming the carrier 10 within a structure, such as a cavity, allows for the carrier 10 to fill voids and/or complex structures that would otherwise be difficult or impossible to reach with a preformed shape. The injected carrier 10 may be a two-part composition in which a first part A and a second part B are combined during injection. The combination of the two parts may activate that material of the carrier, thereby providing a material the adheres and/or cures to cavity being filled. Thus, the carrier 10 as described herein may beneficially improve overall manufacturing times and/or costs by eliminating assembly steps or potential issues that may arise during installation. The carrier 10 may be formed to fill any desired shape and/or void.

Figure 2:
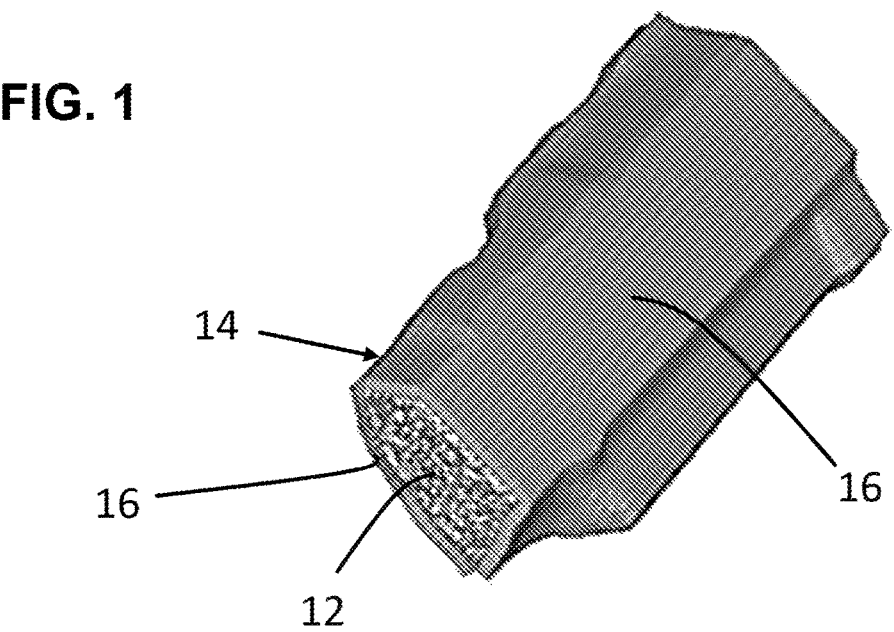
FIG. 2 is a perspective view of a carrier in accordance with the present teachings.

FIG. 2 illustrates a perspective view of a carrier 10. The carrier 10 includes a core 12 substantially surrounded by an outer layer 14. The outer layer 14 includes a plurality of adjoining sides 16 that form an outer structure of the carrier 10. It should be noted that the outer layer 14 and the core 12 may be monolithically formed (i.e., integrally formed). For example, the outer layer 14 and the core 12 may each be formed from a single material composition (e.g., a foamed material). As illustrated, the carrier 10 may be shaped to meet any desired dimensions. For example, the carrier 10 may include one or more contoured or undulating surfaces, steps, transition points, or a combination thereof. However, it is contemplated that the carrier 10 may be free of any additional structural features, such as ribs, gussets, open pockets, cavities, or a combination thereof.

Figure 3:
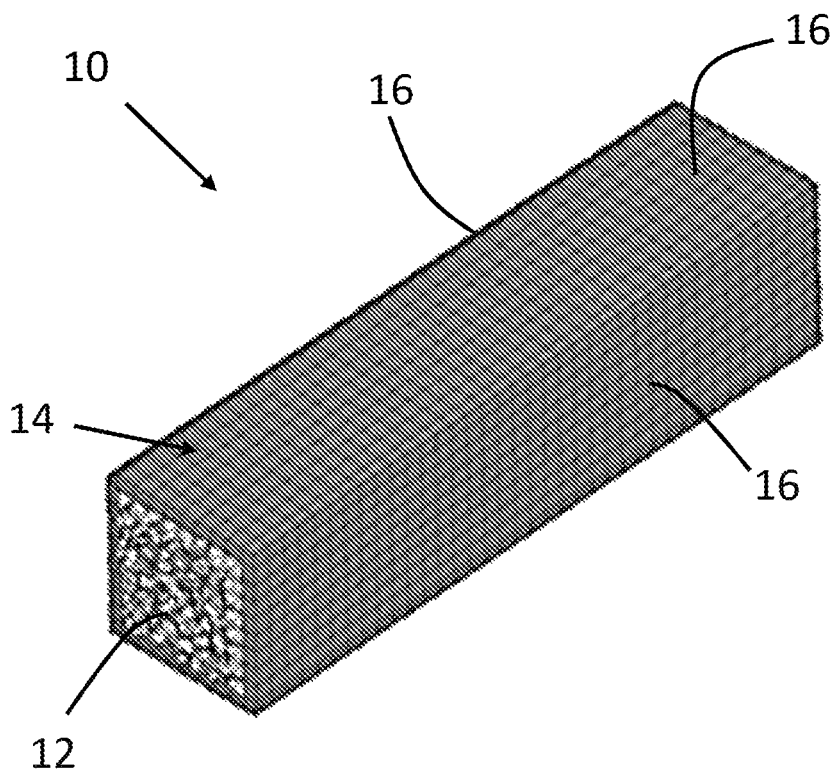
FIG. 3 is a perspective view of a carrier in accordance with the present teachings.

FIG. 3 illustrates a perspective view of a carrier 10. The carrier 10 includes a core 12 substantially surrounded by an outer layer 14. The outer layer 14 includes a plurality of adjoining sides 16 that form an outer structure of the carrier 10. It should be noted that the outer layer 14 and the core 12 may be monolithically formed (i.e., integrally formed). For example, the outer layer 14 and the core 12 may each be formed from a single material composition (e.g., a foamed material). As illustrated, the carrier 10 may be substantially rectangular and the rectangular shape may be formed by the plurality of sides 16. The carrier 10 may also be free of any secondary mechanical attachment features, such as fasteners, clips, arms, hooks, the like, or a combination thereof. However, it is also contemplated that the carrier 10 may be secured within a desired cavity, to a desired structure, or both via one or more mechanical attachment features.

Figure 4:
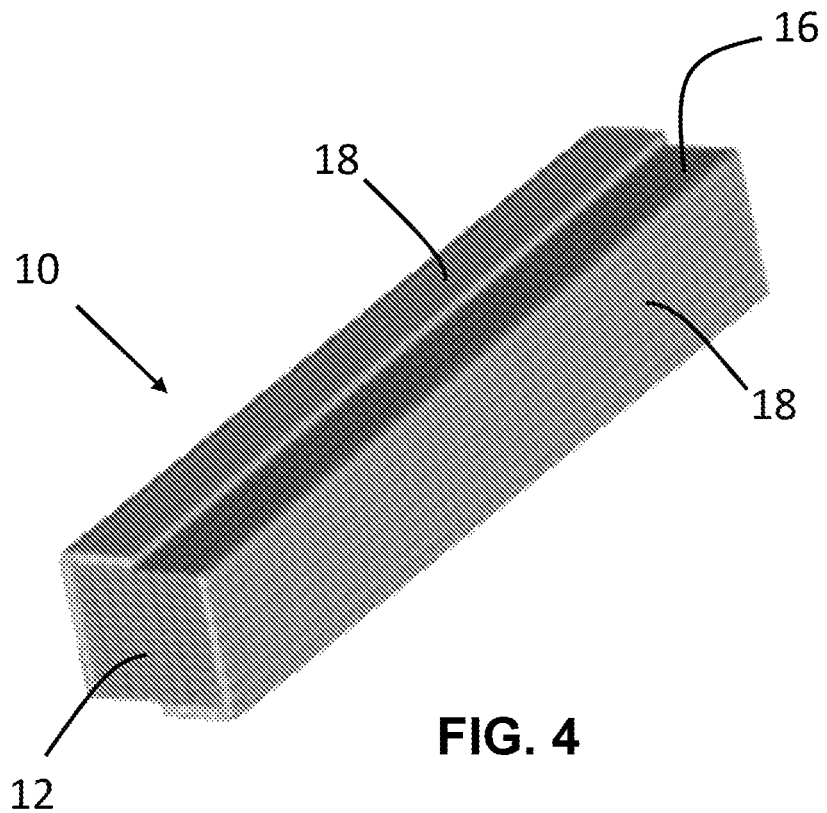
FIG. 4 is a perspective view of a carrier having an adhesive partially disposed on a surface of the carrier in accordance with the present teachings.

FIG. 4 illustrates a perspective view of a carrier 10. The carrier 10 includes a core 12 substantially surrounded by an outer layer 14. The outer layer 14 includes a plurality of adjoining sides 16 that form an outer structure of the carrier 10. It should be noted that the outer layer 14 and the core 12 may be monolithically formed (i.e., integrally formed). For example, the outer layer 14 and the core 12 may each be formed from a single material composition (e.g., a foamed material). As illustrated, the carrier 10 may be substantially rectangular and may be formed by the plurality of sides 16. As shown, an adhesive 18 may be disposed on one or more sides 16 of the carrier 10. The adhesive 18 may extend beyond a single side 16 of the carrier 10. Furthermore, the adhesive 18 may terminate near one or more ends of the carrier 10 so that the adhesive 18 and the carrier 10 are coextensive.

Figure 5:
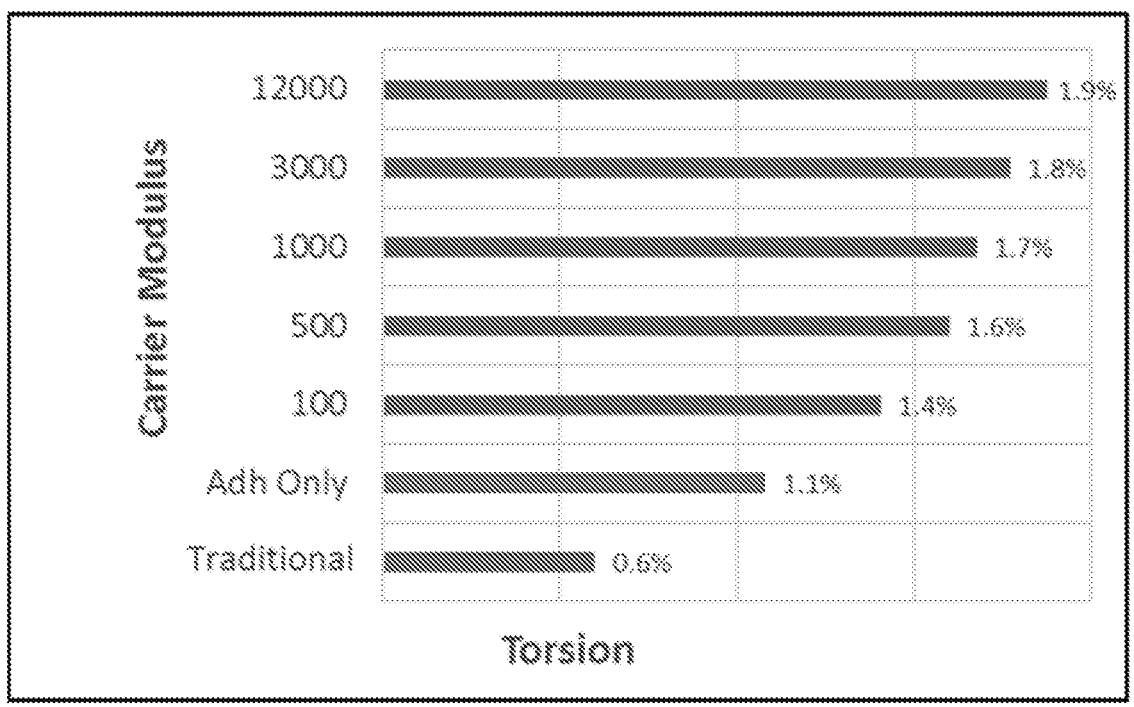
FIG. 5 is a comparison chart of carrier moduli in accordance with the present teachings.

FIG. 5 is a comparison chart of various carrier moduli in accordance with the present teachings. As illustrated, a torsion finite element analysis (FEA) was conducted on a variety of sample parts that may be implemented into a lower portion of a sample C-pillar of a vehicle. The samples include a traditional carrier (e.g., a non-ester foamed carrier), an adhesive material, and a plurality of ester foam carriers with different moduli of elasticity. As shown, a percentage of torsion increased as the modulus of elasticity increased for the ester foam carriers. Additionally, the ester foam carriers and adhesive material, alone or in combination, provided increased torsion when compared to a traditional carrier.

Figure 6:
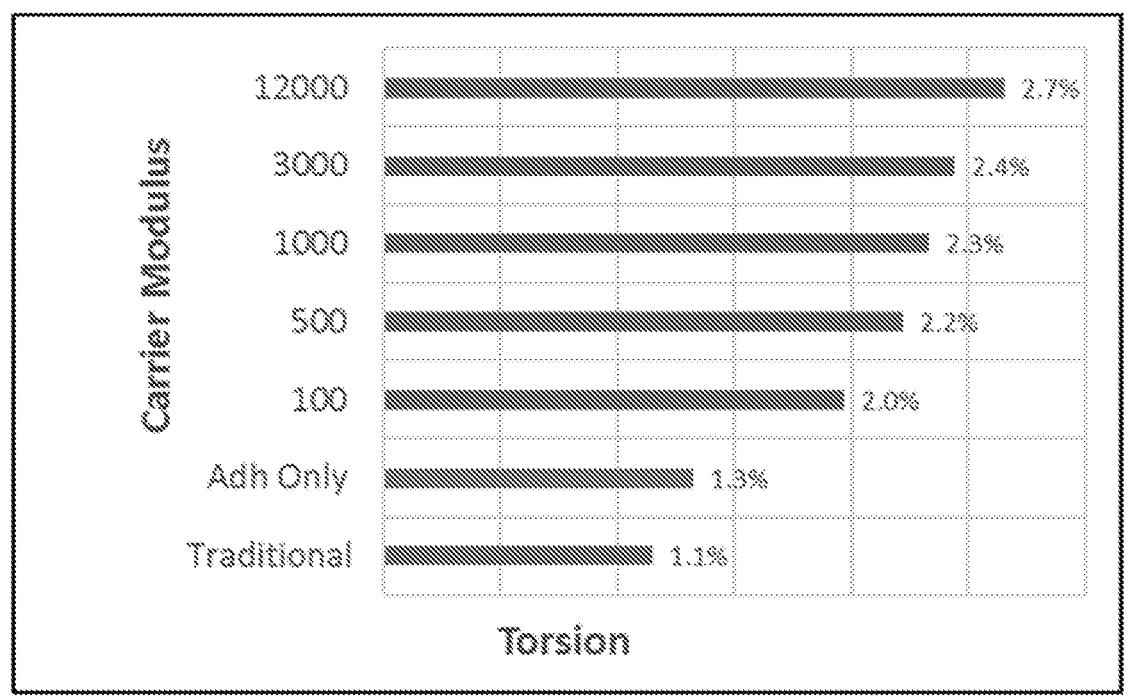
FIG. 6 is a comparison chart of carrier moduli in accordance with the present teachings.

FIG. 6 is a second comparison chart of various carrier moduli in accordance with the present teachings. As illustrated, a torsion finite element analysis (FEA) was conducted on a variety of sample parts that may be implemented into an upper portion of a sample C-pillar of a vehicle. The samples include a traditional carrier (e.g., a non-ester foamed carrier), an adhesive material, and a plurality of ester foam carriers with different moduli of elasticity. As shown, a percentage of torsion increased as the modulus of elasticity increased for the ester foam carriers. Additionally, the ester foam carriers and adhesive material, alone or in combination, provided increased torsion when compared to a traditional carrier.

Figure 7:
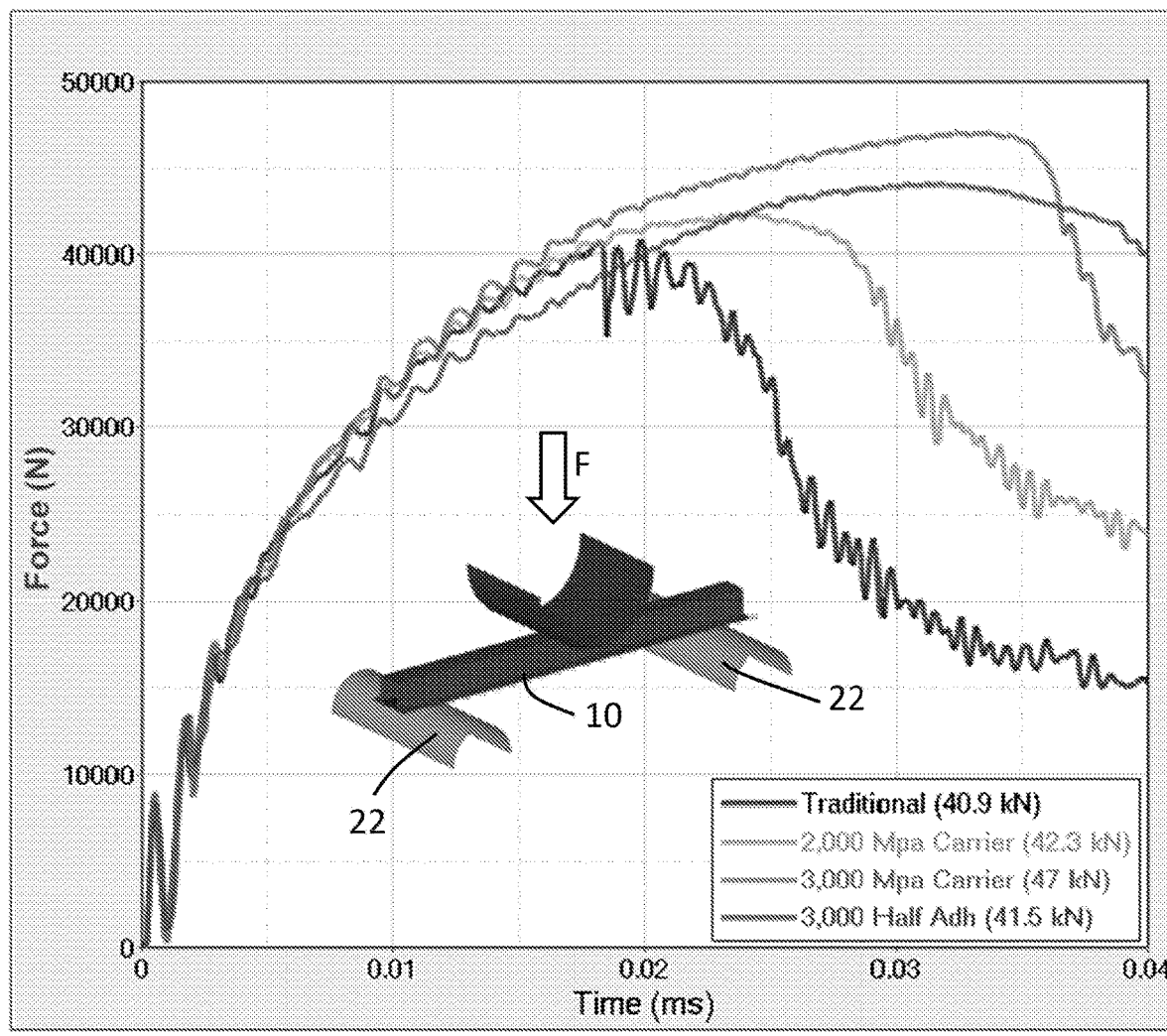
FIG. 7 is a graph illustrating bend strength of a carrier in accordance with the present teachings.

FIG. 7 is a graph illustrating bend strength of a carrier 10 extending between opposing supports 22. A force (F) is applied to the carrier 10 between the supports 22. Testing was conducted on a traditional carrier (i.e., non-foamed carrier), an ester foam carrier having a modulus of elasticity of about 2,000 MPa, and an ester foam carrier having modulus of elasticity of about 3,000 MPa with and without an adhesive. As shown, the traditional carrier had the lowest bend force at 40.9 kN, while the ester carriers all had an increased bend force.

Figure 8A:
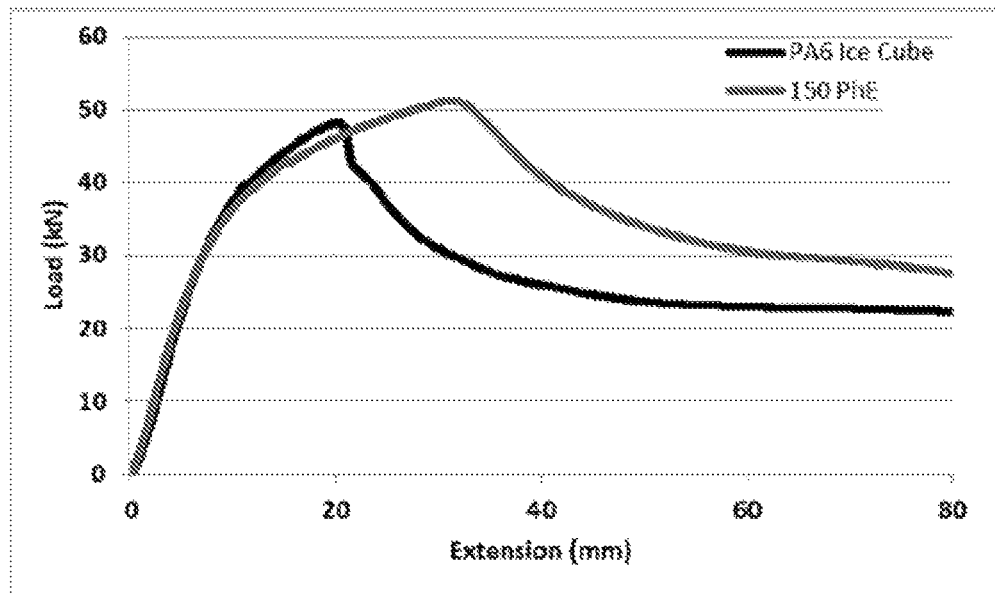
FIG. 8A is a graph illustrating strength of a carrier cured using a baking process.
Figure 8B:
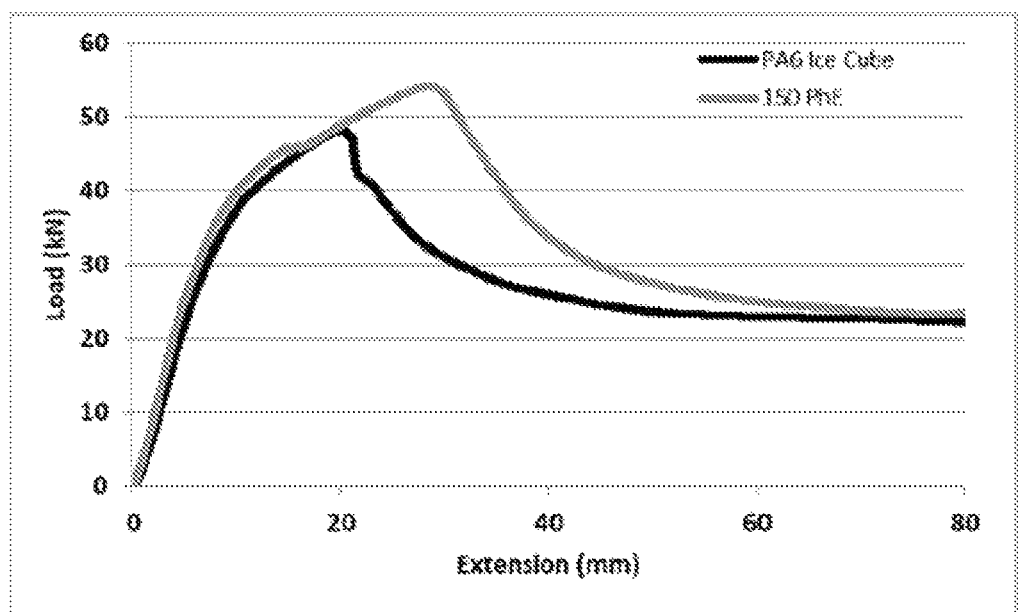
FIG. 8B is a graph illustrating strength of a carrier cured at room temperature.

FIGS. 8A and 8B are graphs illustrating the strength of a carrier cured using baking at a heightened temperature and cured at room temperature, respectively. Testing was conducted on a traditional Polyamide 6 (PA6) structure (i.e., non-foamed carrier) and the ester carriers as described herein. As shown in FIGS. 8A and 8B, ester carriers having an adhesive disposed over at least a portion of its surface was stronger and exhibited higher energy absorption (EA) when compared to the conventional PA6 carrier. FIGS. 8A and 8B illustrate ester carriers having different expansion rates and different adhesive coverage. As illustrated, while the ester carriers may be highly tunable based on a given application, strength of the ester carrier remains significantly improved over the conventional PA6 carrier.

Figure 9:
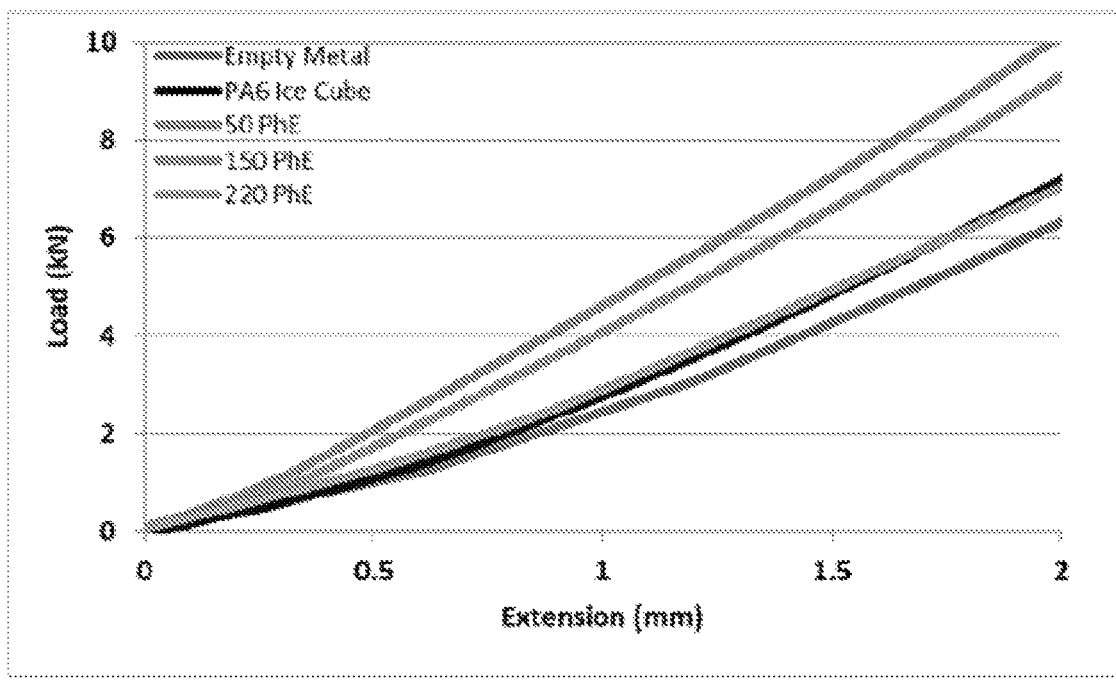
FIG. 9 is a graph illustrating strength of various carriers in accordance with the present teachings.

FIG. 9 is a graph illustrating the strength of various ester carriers compared to a conventional Polyamide 6 (PA6) carrier and an empty metal carrier (i.e., hollow). As shown, by modifying the composition of the ester carriers strength performance may also be modified. Each ester carrier tested exhibited approximately the same or better strength when compared to the conventional PA6 carrier. Additionally, by modifying one or more properties of the ester carriers (e.g., expansion rate, additives, overall chemical composition, etc.), the ester carriers may beneficially exhibit a significantly greater strength when compared to an empty metal carrier or a conventional PA6 carrier. It should be noted that the ester carriers tested were free of a secondary adhesive disposed along an outer surface. The ester carrier itself would act as the adhesive to bond to one or more additional structures for reinforcement. Thus, the ester carrier would provide 100% coverage for adhesion since an entire outer surface of the ester carrier may be considered an adhesive. Conversely, the conventional PA6 carrier tested had approximately 50% coverage along an outer surface with an adhesive. As shown, the adhesive coverage between the carriers may be a critical factor when determining the strength of each carrier.

Figure 10A:
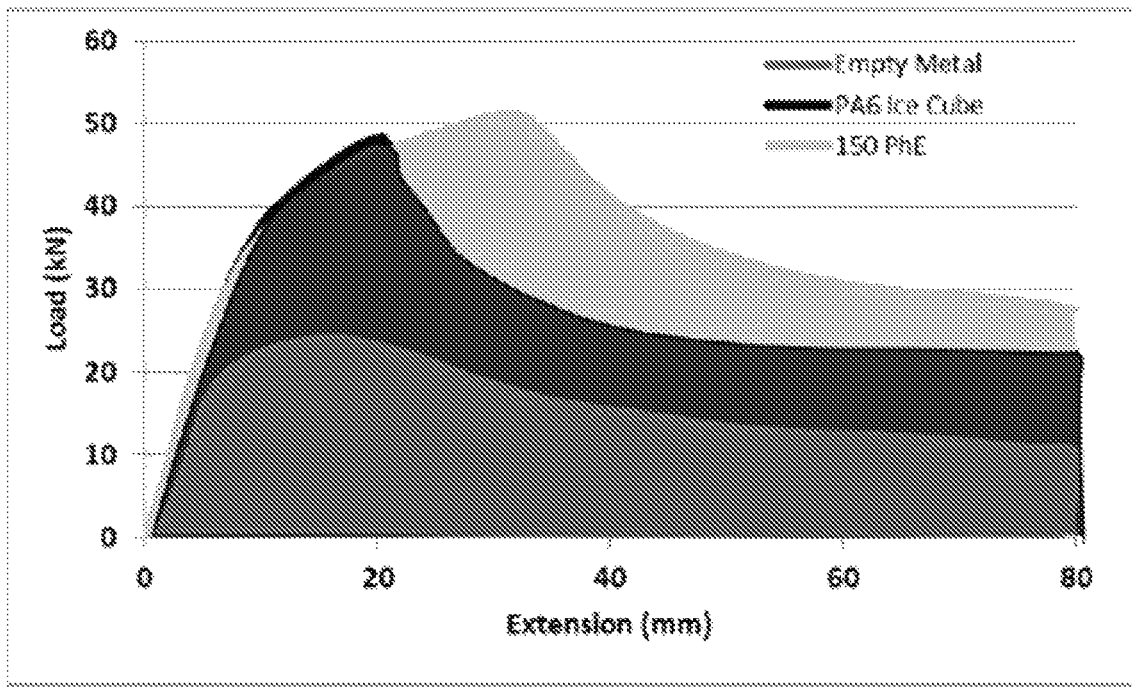
FIG. 10A is a graph illustrating energy absorption of a carrier cured using a baking process.
Figure 10B:
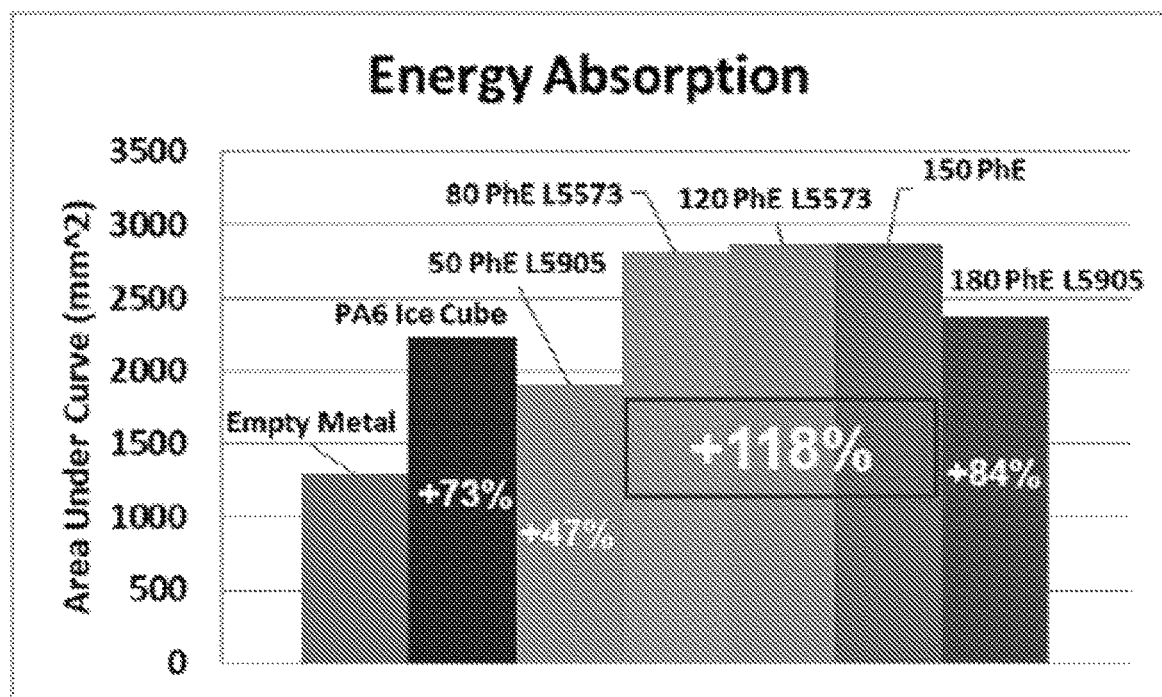
FIG. 10B is a graph illustrating energy absorption of a carrier using a baking process.

FIGS. 10A and 10B illustrate energy absorption of a carrier cured using a baking process at a heightened temperature. As shown in FIG. 10A, an ester carrier with at least partial adhesive coverage absorbed more energy during impact than a conventional Polyamide 6 (PA6) carrier or an empty (i.e., hollow) metal carrier. The energy absorption may be calculated based upon an area under the curve of each material tested in FIG. 10A. Similarly, as shown in FIG. 10B, the ester carrier improved energy absorption by about 118% when compared to the empty metal and exhibited improved energy absorption over the PA6 carrier. As illustrated, the ester carrier advantageously provided improved energy absorption while also still being able to hold the applied load 2.5 times the load near the end of the testing conducted.

Figure 11A:
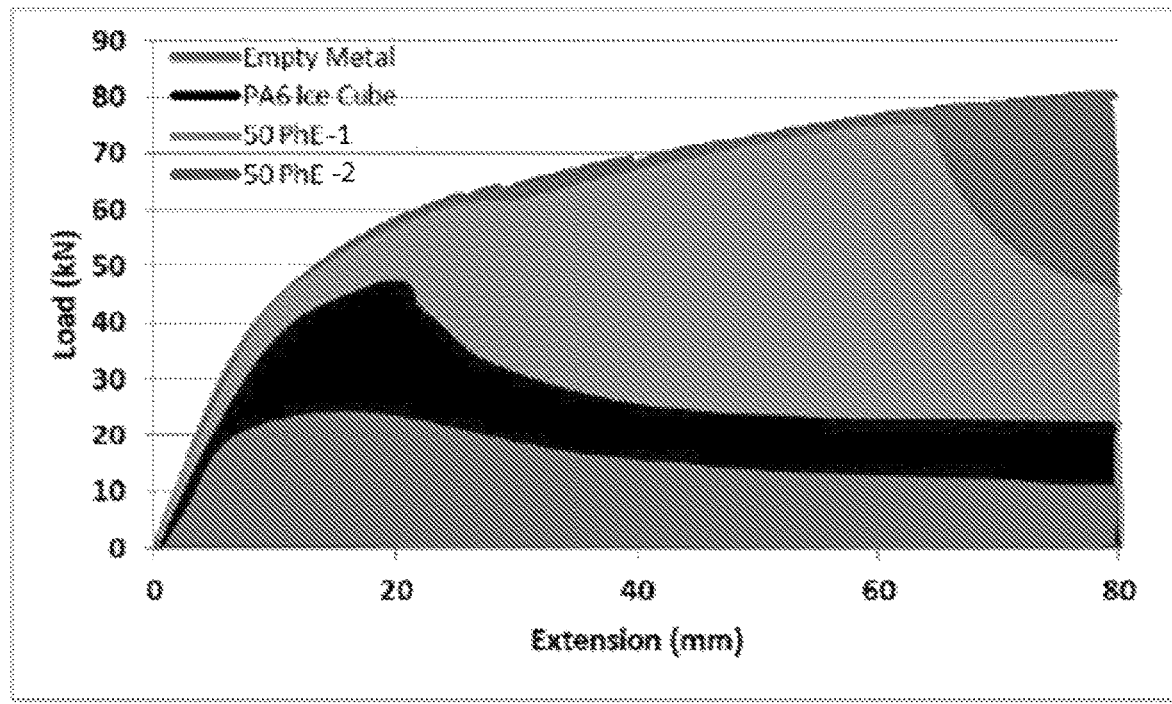
FIG. 11A is a graph illustrating energy absorption of a carrier cured at room temperature.
Figure 11B:
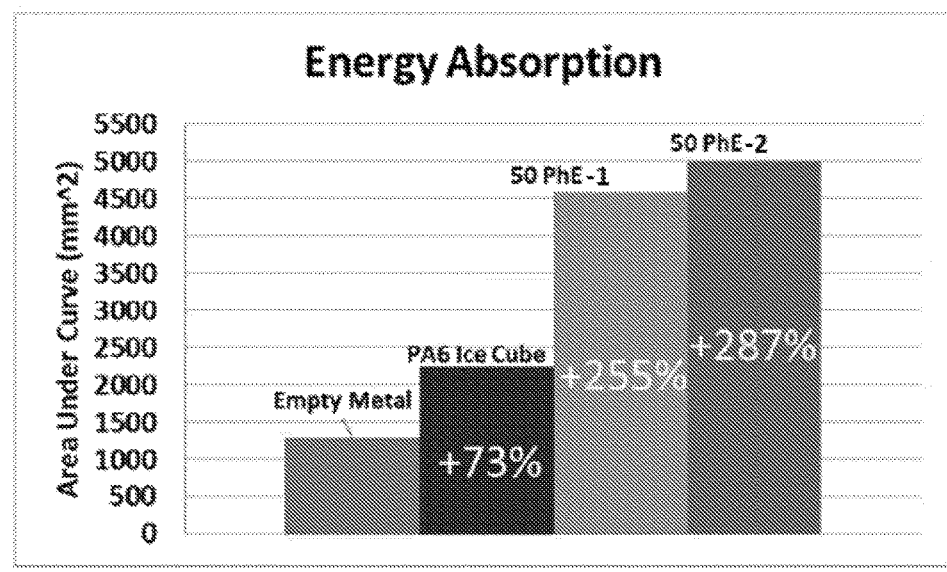
FIG. 11B is a graph illustrating energy absorption of a carrier cured at room temperature.

FIGS. 11A and 11B illustrate energy absorption of a carrier cured at room temperature. As shown in FIG. 11A, ester carriers with different expansion rates (labelled 50 PhE-1 and 50 PhE-2) absorbed more energy during impact than a conventional Polyamide 6 (PA6) carrier or an empty (i.e., hollow) metal carrier. The energy absorption may be calculated based upon an area under the curve of each material tested in FIG. 11A. Similarly, the energy absorption may be even further improved by varying the expansion rate of the ester carrier. For example, as shown in FIG. 11A, 50 PhE-2 exhibited improved energy absorption when compared to 50 PhE-1 based upon a different expansion rate. Similarly, as shown in FIG. 11B, the ester carriers with different expansion rates improved energy absorption by at least 255% when compared to the empty metal and exhibited improved energy absorption over the PA6 carrier. Additionally, by varying the expansion rate of the ester carrier, energy absorption may even be improved by about 287% when compared to the empty metal. As illustrated, ester carrier 50 PhE-2 advantageously provided improved energy absorption while also still being able to hold the applied load 7.4 times the load near the end of the testing conducted. It should also be noted that the peak strength of the ester carrier 50 PhE-2 was not reached during the load application shown in FIG. 11A. Therefore, it may be gleaned from the present teachings that the ester carrier with a 20% expansion rate would have a significantly higher peak strength when compared to the PA6 carrier and the metal carrier.

Figure 11C:
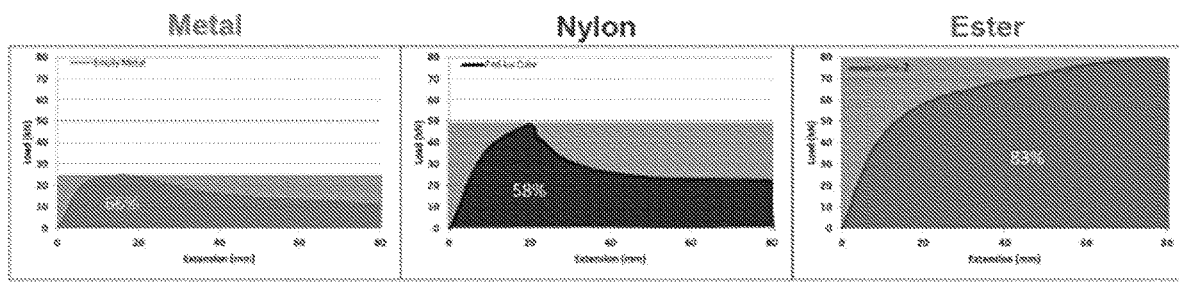
FIG. 11C is a graph illustrating energy absorption efficiency of a carrier cured at room temperature.

FIG. 11C shows side-by-side graphs illustrating the efficiency of energy absorption of the carriers shown in FIGS. 11A and 11B. As shown, the substantially rectangular shaded area portrays the total possible amount of energy absorption for each material based on each material's peak strength. In other words, the total amount of energy that may possibly be absorbed would correlate to the material being under stress at its peak strength 100% of the time. As illustrated, even with a significantly lower peak strength, the hollow metal and PA6 ("Nylon) carriers only absorbed about 66% and about 58%, respectively, of the total possible energy. Conversely, not only did the ester carrier 50 PhE-2 exhibit a significantly higher peak strength (greater than 80 kN), the ester carrier also absorbed about 83% of the total possible energy. Thus, it may be concluded that the ester carrier would more not only resist a higher force but also absorb a given force in a much more efficient manner.

| ELEMENT LIST | |
|---|---|
| 10 | Carrier |
| 12 | Core |
| 14 | Outer Layer |
| 16 | Side |
| 18 | Adhesive |
| 22 | Support |
| F | Bending Force |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A structural carrier comprising:
    a) a foam core which is a solid foam material; and
    b) an outer layer which is an adhesive, completely surrounds and is directly adjacent to the foam core, and forms an exterior surface of the structural carrier such that the outer layer is adapted to be an interface between the structural carrier and one or more structures reinforced by the structural carrier;
        wherein the foam core and the outer layer are monolithically formed such that the outer layer is integral with and made of the same material composition as the foam core;
        wherein the foam core and the outer layer are free of structurally reinforcing ribs and open pockets;
        wherein the foam core and the outer layer are formed of the material composition comprising one or more phosphate esters and polyurethane;

wherein the foam core is free of any blowing agents, curing agents, or both;

wherein the foam core is curable at a temperature of about 0° C. to about 50° C.; and wherein the outer layer is a heat-activated adhesive curable above 50° C.

2. The structural carrier of claim 1, wherein the one or more phosphate esters includes a phosphate ester derived from cashew nutshell liquid (CNSL).

3. The structural carrier of claim 1, wherein the structural carrier has a modulus of elasticity of about 1,000 MPa to about 8,000 MPa.

4. A structural carrier comprising:
a) a foam core which is a solid foam material; and
b) an outer layer which is an adhesive, completely surrounds and is directly adjacent to the foam core, and forms an exterior surface of the structural carrier such that the outer layer is adapted to be an interface between the structural carrier and one or more structures reinforced by the structural carrier;

wherein the foam core and the outer layer are monolithically formed such that the outer layer is integral with and made of the same material composition as the foam core;

wherein the foam core and the outer layer are free of structurally reinforcing ribs and open pockets;

wherein the foam core and the outer layer are made of the material composition comprising one or more phosphate esters and polyurethane;

wherein the foam core is free of any blowing agents, curing agents, or both; and wherein the foam core is curable at a temperature of about 0° C. to about 50° C.

5. The structural carrier of claim 4, wherein the structural carrier has a modulus of elasticity of about 20 MPa to 8,000 MPa.

6. The structural carrier of claim 1, wherein the foam core foams at room temperature.

7. The structural carrier of claim 4, wherein the one or more phosphate esters includes a phosphate ester derived from cashew nutshell liquid (CNSL).

8. A method of forming the structural carrier of claim 1, the method including:
(a) molding the outer layer; and
(b) spraying a foam into the outer layer to form the foam core.

9. A method of forming the structural carrier of claim 4, the method including:
(a) forming the foam core into a desired shape using one or more sprayable foaming materials; and
(b) casting, overmolding, pressing, or a combination thereof an adhesive material to the foam core along at least a portion of the foam core to form the outer layer, wherein the one or more sprayable foaming materials and the adhesive material are made of the material composition comprising the one or more phosphate esters and the polyurethane.

10. The method of claim 9, wherein the adhesive material is a pressure sensitive adhesive, and the pressure sensitive adhesive is applied directly to the foam core.

11. The method of claim 10, wherein the pressure sensitive adhesive is applied to the foam core free of any mechanical fasteners.

12. A method of forming the structural carrier of claim 1 to reinforce a cavity of a transportation vehicle, the method including: injecting, spraying, or both the material composition comprising the one or more phosphate esters and the polyurethane directly into the cavity so that the material composition cures within the cavity to form the foam core and the outer layer of the structural carrier.

13. The method of claim 12, wherein the material composition is a two-part composition in which first and second parts of the material composition are mixed upon injection, spraying, or both to activate the material composition.

* * * * *